Patented Dec. 27, 1949

2,492,702

UNITED STATES PATENT OFFICE 2,492,702

PROCESS OF SIZING PAPER AND PRODUCT

Willi Neubert, Hans Krzikalla, and Richard Armbruster, Ludwigshafen-on-Rhine, Germany, assignors, by mesne assignments, to General Aniline & Film Corporation, New York, N. Y., a corporation of Delaware No Drawing. Application June 16, 1939, Serial No. 279,495. In Germany July 8, 1938

6 Claims. (Cl. 92—21)

The present invention relates to a process of sizing paper.

We have found that paper can be sized in a very advantageous manner by using therefor the usual resin or wax sizes together with high molecular, basic organic compounds which form difficultly soluble compounds with the saponified resins and/or waxes. As suitable high molecular, basic organic compounds may be mentioned the condensation products of amine salts or ammonium salts with aldehydes or other organic carbonyl compounds having activated methyl or methylene groups. These substances in the form of their salts are soluble in water and are therefore preferably used in the form of salts in dissolved form.

In practicing the present invention, the following specific types of high molecular basic organic compounds are particularly suited for use: the nitrogenous condensation products obtainable according to United States Patent No. 2,296,211 or the nitrogenous condensation products used in United States Patent No. 2,257,239, both in the names of Hans Krzikalla and Richard Armbruster; and the condensation products of carbon compounds containing hydrogen attached to nitrogen, namely amino or imino groups, with carbonyl compounds, especially aldehydes, are also quite generally suited for use in the present invention. This last mentioned type of condensation products are obtainable by the action of aldehydes, in particular formaldehyde, on the aqueous neutral or acid solution of said carbon compounds in the presence of ammonium salts or salts of low aliphatic amines as catalysts. Suitable carbon compounds containing hydrogen attached to nitrogen, i. e., amine groups, for use in this condensation are urea, dicyandiamide, guanidine, dodecylamine and aniline. Other high molecular basic organic compounds, suitable for use in the present invention, are the basic condensation products obtainable by the reaction of phenols, naphthols and derivatives of the same with aldehydes, in particular formaldehyde, in the presence of ammonium or amine salts. Furthermore, the polyethylene polyamines, which are obtainable by the reaction of ethylene chloride with ammonia, are suitable for use in the present invention. The reaction products of the polyethylene polyamines, as for example, the substances obtainable by reacting polyethylene polyamines with fatty acids or high molecular alkyl halides, i. e., chlorinated paraffin wax, may be used and also the quaternary ammonium compounds obtainable from the said polyethylene polyamines and their reaction products, are suitable for use. Specific examples of such quaternary ammonium compounds are the high molecular basic substances obtainable according to German specification No. 559,500 and used according to German specification No. 629,732. These polyamines and their reaction products will be hereinafter referred to as polyalkylene polyamines.

The high molecular, basic organic substances are preferably added to the paper pulp in the hollander before or after the addition of the resin or wax size. The resin or wax size may have added to it, in addition to the said basic substances, also other additions, as for example animal glue or casein and, in the case of resin sizing, also waxes or cellulose derivatives; synthetic tanning agents may also be incorporated therewith with advantage, as for example condensation products of napthalene sulphonic acid and formaldehyde.

A considerable advantage of the new process consists in the fact that considerable amounts of resin or wax may be saved. For example, with the co-employment of naphthalene sulphonic acid-formaldehyde condensation products, up to 80 per cent less of resin is necessary than is necessary without the additional substance.

The process renders it possible also to avoid the difficulties which arise in the manufacture of paper dyed with dyestuffs which go onto the fibres from acid baths, as Orange II, Orange RO and Cotton Scarlet Red (Schultz, Farbstofftabellen, 7th edition, 1931, Nos. 189, 198 and 539). These dyestuffs have the property to destroy the sizing of paper so that it is impossible to prepare well sized papers or card-board dyed with these dyestuffs, especially dyed deep shades; this is true irrespective of what kind of resin size is used or whether completely or weakly saponified resin sizes are used. By the addition of protective-colloids, as for example animal glue or casein, or also of wax size, a good sizing of papers colored with the said dyestuffs is not obtained even when unusually large amounts of resin size, and if desired also of aluminium sulphate, with or without the use of protective colloids, are used.

These difficulties are obviated by using the high molecular, basic organic compounds mentioned above. By incorporating them in the paper pulp at any desired stage of the manufacture, the papers or card-boards dyed with the said dyestuffs receive a satisfactory sizing and fastness to ink. The high molecular basic compounds forming difficultly soluble compounds with the dyestuffs are incorporated, preferably in the form of their water-soluble salts, in the paper pulp serving for the making of the paper, either before or after the sizing, preferably together with synthetic tans.

The co-employment of the said basic compounds offers also particular advantages when uncolored or colored papers or card-boards which are smooth on one side are prepared. When producing papers smooth on one side, a sizing fast to writing or inks often cannot be obtained, irrespective of what kind of resin size is used, if desired in conjunction with protective colloids, such as animal glue or casein. The cause of this lies in the fact that to produce a good smoothness on one side, the web of paper or card-board must be led with a high moisture content to the smoothing cylinder through which the drying mainly takes place. For this purpose it is necessary to use relatively high temperatures which prevent the normal course of the "fritting" necessary for the production of papers fast to writing and inks. This drawback is avoided when the said organic basic substances are added to the paper pulp before or after the sizing.

The following examples will further illustrate the nature of this invention but the invention is not restricted to these examples.

Example 1

Paper pulp is mixed in the hollander with 0.5 per cent of saponified resin. For the precipitation of the resin size there are then added 2 per cent of aluminium sulphate in solid or dissolved form and then 0.5 per cent of a condensation product of 1 molecular proportion of ammonium chloride, 2 to 3 molecular proportions of formaldehyde and 1 molecular proportion of acetaldehyde prepared according to the said U. S. Patent #2,296,211. The paper plup is then worked up into paper in the usual manner.

The order of the addition to the paper plup may also be as follows: first the said condensation product, then the saponified resin and finally the aluminium sulphate.

Before or after the sizing, there may also be added to the paper plup 0.1 per cent of naphthalene sulphonic acid-formaldehyde condensation product (with reference to dry paper plup) in aqueous solution.

Example 2

Paper plup is mixed in the hollander with 1 per cent of emulsified montan wax, 3 per cent of aluminium sulphate in solid or dissolved form are then added and then 0.5 per cent of the condensation product specified in paragraph 1 of Example 1. After further working up in the usual manner a well sized paper is obtained.

The sequence of the additions may also be varied as in Example 1.

Instead of the said condensation product, the other high molecular, basic substances hereinbefore specified may also be used with a similar result.

Example 3

2 per cent of a condensation product prepared from 1 molecular proportion of ammonium chloride, 2 to 3 molecular proportions of formaldehyde and 1 molecular proportion of acetaldehyde according to the said U. S. Patent #2,296,211, are added to paper pulp in a hollander. The mass is then colored with 3 per cent of Orange II and then sized with 2 per cent of 50 per cent resin size and 3 per cent of aluminium sulphate in the usual manner. A well sized paper fast to inks is obtained.

Example 4

Paper plup is colored in the hollander with 3 per cent of Orange II. It is then sized in the usual manner with 2 per cent of 50 per cent resin size and 3 per cent of aluminium sulphate. 2 per cent of a condensation product prepared from 1 molecular proportion of ammonium chloride, 2 to 3 molecular proportions of formaldehyde and 1 molecular proportion of acetaldehyde according to the said U. S. Patent #2,296,211, are then added. After the usual working up a well sized paper is obtained.

Example 5

The procedure of Example 3 or 4 is followed and, after sizing, an aqueous solution of 0.2 per cent of a condensation product of naphthalene sulphonic acid and formaldehyde is added to the paper pulp.

Other synthetic tanning agents, as for example phenol-sulphonic acid-formaldehyde condensation products, may be used as additions.

Example 6

Paper pulp is mixed in the hollander with 1.5 per cent of saponified resin. In order to precipitate the resin size, 4 per cent of aluminium sulphate are added in solid or dissolved form. 2 per cent of a condensation product prepared from 1 molecular proportion of ammonium chloride, 2 to 3 molecular proportions of formaldehyde and 1 molecular proportion of acetaldehyde according to the said U. S. Patent #2,296,211 are then added. The mass is then worked up in the usual way to paper smooth on one side, a good sizing being obtained.

The said condensation product may also be added first, followed by the saponified resin and finally the aluminium sulphate.

Example 7

The procedure described in Example 6 is followed, 0.1 per cent of a condensation product or naphthalene sulphonic acid and formaldehyde being added before or after the sizing. Other synthetic tanning agents may also be used.

What we claim is:

1. Paper containing as a size a composition comprising a difficultly soluble compound formed by the reaction of a saponified size selected from the class consisting of usual saponifiable resin and saponifiable wax sizes with a minor amount up to a few per cent, calculated on the dry paper pulp mass, of a synthetic high molecular weight basic organic nitrogenous condensation product of a salt of a nitrogenous compound containing hydrogen attached to nitrogen and selected from the class consisting of ammonia, aliphatic and aryl amines with formaldehyde and one other organic carbonyl compound selected from the class consisting of aldehydes and ketones.

2. Paper containing as a size a composition comprising a difficultly soluble compound formed by the reaction of a saponified size selected from the class consisting of usual saponifiable resin and saponifiable wax sizes with a minor amount up to a few per cent, calculated on the dry paper pulp mass, of a synthetic high molecular weight basic organic nitrogenous condensation product of a salt of a nitrogenous compound containing hydrogen attached to nitrogen and selected from the class consisting of ammonia, aliphatic and aryl amines with formaldehyde and acetaldehyde.

3. Paper containing as a size a composition comprising a difficultly soluble compound formed by the reaction of a saponified size selected from the class consisting of usual saponifiable resin and saponifiable wax sizes with a minor amount up to a few per cent, calculated on the dry paper pulp mass, of a synthetic high molecular weight basic organic nitrogenous condensation product of an ammonium salt of a strong non-oxidizing acid with formaldehyde and acetaldehyde.

4. In the production of paper, the steps which comprise applying to the paper pulp a usual saponified size selected from the class consisting of usual saponified resin and saponified wax sizes and at any stage of the pulp production adding thereto a minor amount up to a few per cent, calculated on the dry solid paper pulp mass, of a synthetic high molecular weight basic organic nitrogenous condensation product of a salt of a nitrogenous compound containing hydrogen attached to nitrogen and selected from the class consisting of ammonia, aliphatic and aryl amines with formaldehyde and one other organic carbonyl compound selected from the class consisting of aldehydes and ketones whereby said nitrogenous condensation product reacts with said size to form a difficultly soluble compound.

5. In the production of paper, the steps which comprise applying to the paper pulp a usual saponified size selected from the class consisting of usual saponified resin and saponified wax sizes and at any stage of the pulp production adding thereto a minor amount up to a few per cent, calculated on the dry solid paper pulp mass, of a synthetic high molecular weight basic organic nitrogenous condensation product of a salt of a nitrogenous compound containing hydrogen attached to nitrogen and selected from the class consisting of ammonia, aliphatic and aryl amines with formaldehyde and acetaldehyde whereby said nitrogenous condensation product reacts with said size to form a difficultly soluble compound.

6. In the production of paper, the steps which comprise applying to the paper pulp a usual saponified size selected from the class consisting of usual saponified resin and saponified wax sizes and at any stage of the pulp production adding thereto a minor amount up to a few per cent, calculated on the dry solid paper pulp mass, of a synthetic high molecular weight basic organic nitrogenous condensation product of an ammonium salt of a strong non-oxidizing acid with formaldehyde and acetaldehyde whereby said nitrogenous condensation product reacts with said size to form a difficultly soluble compound.

WILLI NEUBERT.
HANS KRZIKALLA.
RICHARD ARMBRUSTER.

REFERENCES CITED

The following references are of record in the file of this patent:

UNITED STATES PATENTS

| Number | Name | Date |
|---|---|---|
| 336,013 | Mitscherlich | Feb. 9, 1886 |
| 1,684,755 | Clapp | Sept. 18, 1928 |
| 1,925,526 | Dotzel | Sept. 5, 1933 |
| 1,945,315 | Jacobson | Jan. 30, 1934 |
| 1,968,345 | Murdock | July 31, 1934 |
| 2,021,172 | Bucy | Nov. 19, 1935 |
| 2,038,142 | Sutter | Apr. 21, 1936 |
| 2,075,333 | Arvin | Mar. 30, 1937 |
| 2,098,082 | Bowen et al. | Nov. 2, 1937 |
| 2,170,755 | Hanson | Aug. 22, 1939 |
| 2,192,488 | Reilly | Mar. 5, 1940 |
| 2,197,383 | Outterson | Apr. 16, 1940 |
| 2,221,945 | Hanson | Nov. 19, 1940 |
| 2,257,239 | Krzikalla et al. | Sept. 30, 1941 |
| 2,278,291 | Swan | Mar. 31, 1942 |
| 2,296,211 | Krzikalla et al. | Sept. 15, 1942 |
| 2,299,786 | Battye et al. | Oct. 27, 1942 |

FOREIGN PATENTS

| Number | Country | Date |
|---|---|---|
| 85,944 | Austria | Oct. 25, 1921 |
| 354,510 | Italy | Nov. 25, 1937 |

OTHER REFERENCES

Ellis, The Chemistry of Synthetic Resins, published by Reinhold Publishing Co., vol. 1, pages 357 and 424 (1935).

The Manufacture of Pulp and Paper, published by McGraw-Hill Book Co., 3d edition, section 6, pages 9 and 10 (1938).